Figure 1:
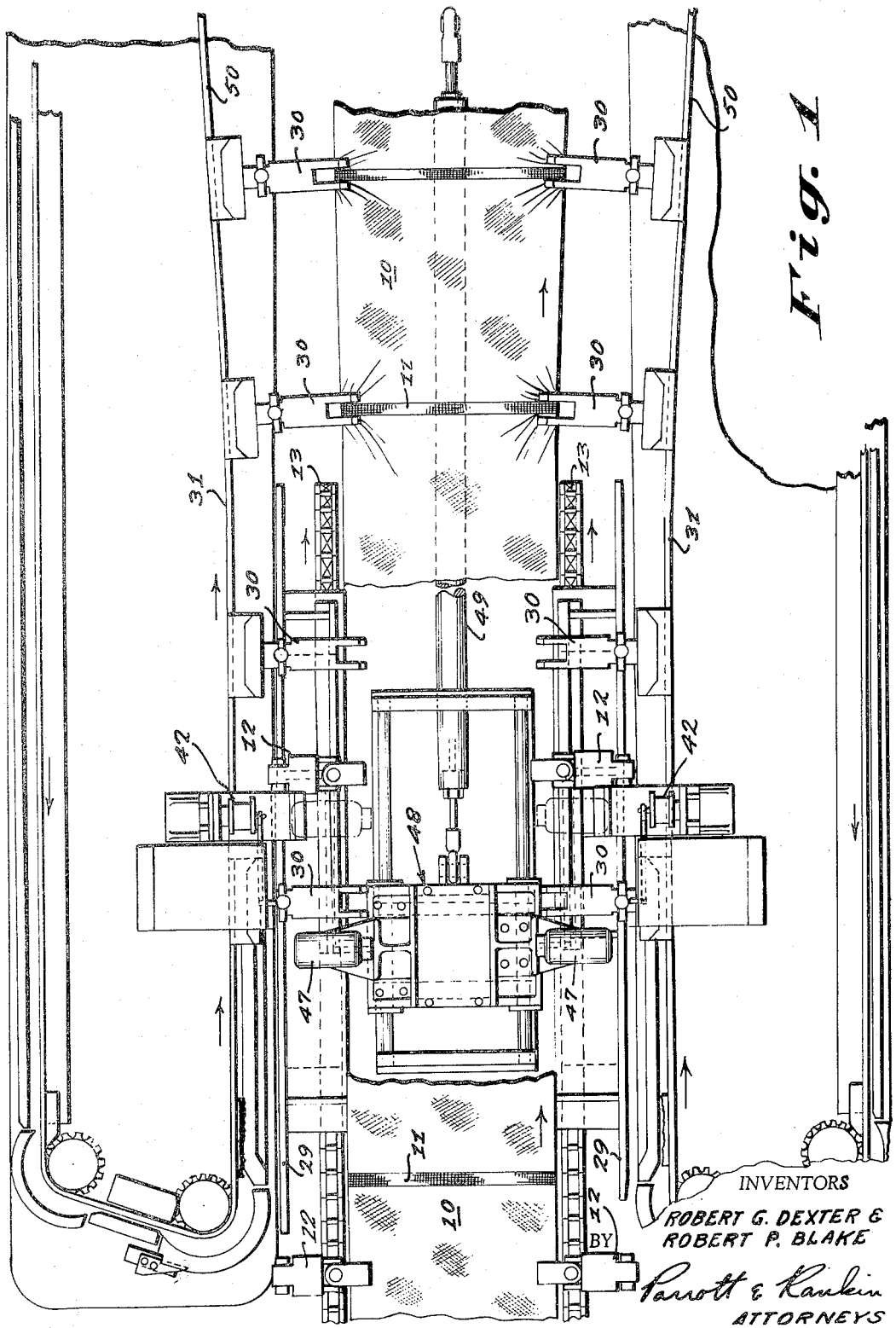

April 19, 1966    R. G. DEXTER ETAL    3,246,816
WEB GRIPPING AND FEEDING MECHANISMS AND METHODS
Filed Dec. 31, 1963    6 Sheets-Sheet 1

INVENTORS
ROBERT G. DEXTER &
ROBERT P. BLAKE
BY
Parrott & Rankin
ATTORNEYS

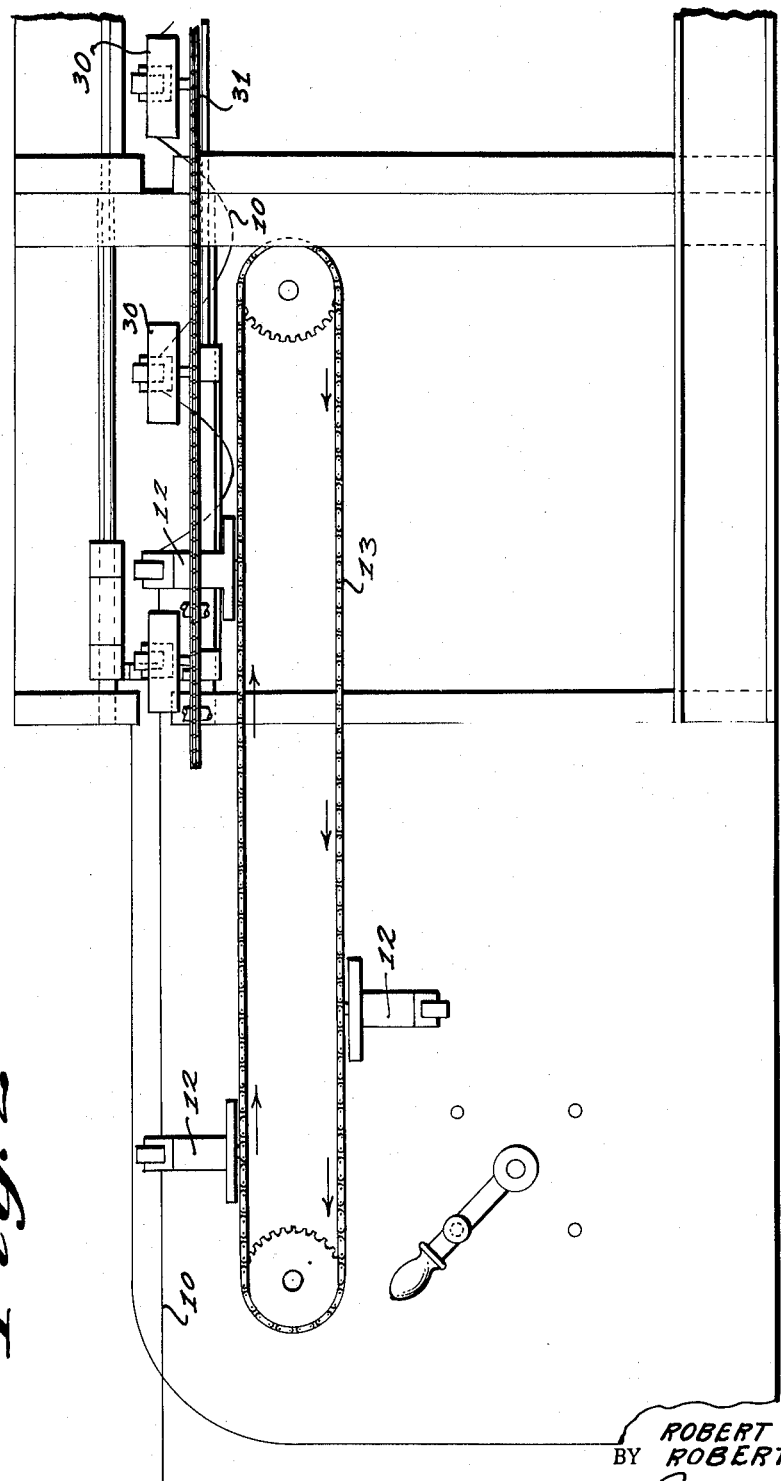

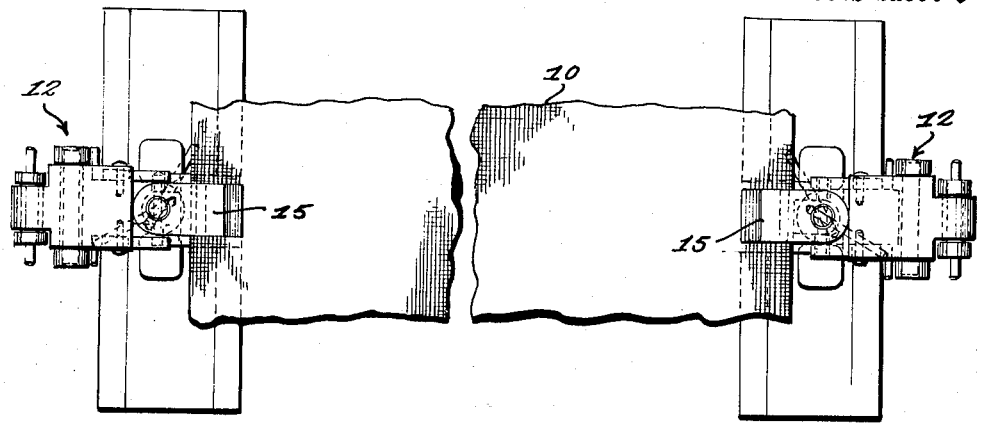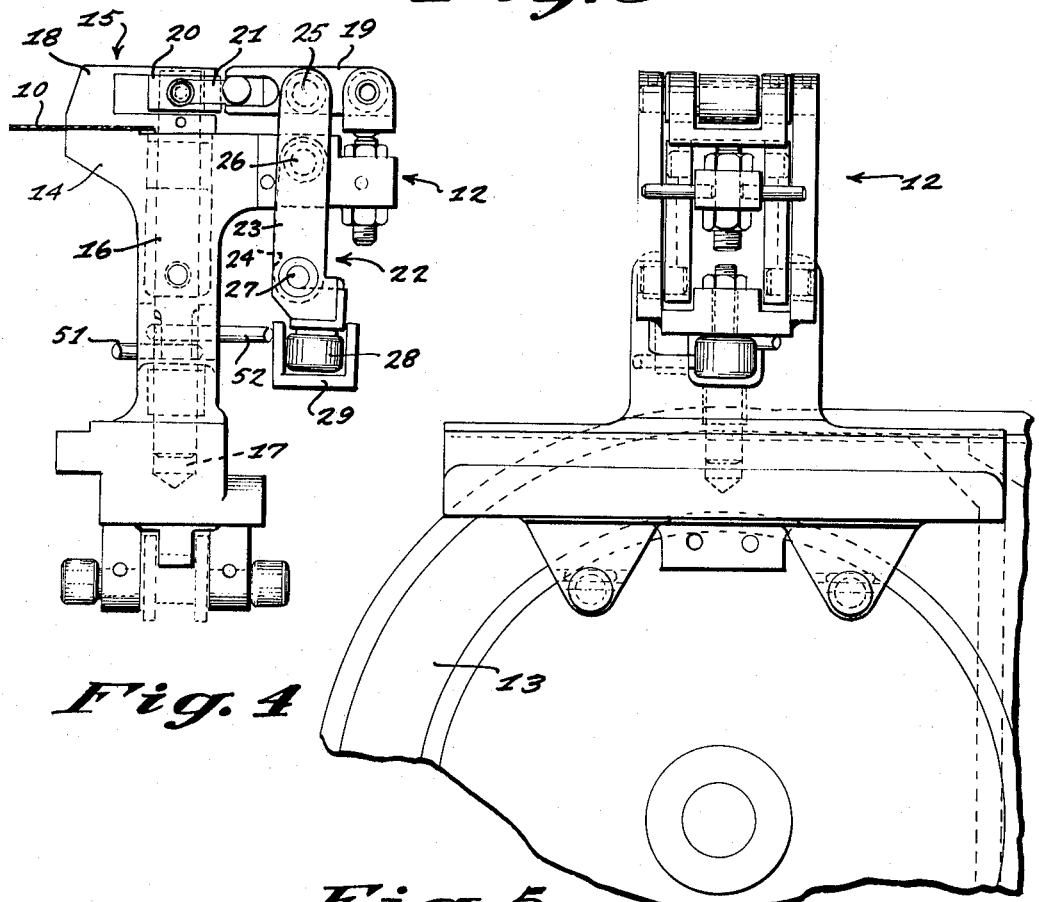

April 19, 1966    R. G. DEXTER ETAL    3,246,816
WEB GRIPPING AND FEEDING MECHANISMS AND METHODS
Filed Dec. 31, 1963    6 Sheets-Sheet 4

INVENTORS
ROBERT G. DEXTER &
BY ROBERT P. BLAKE

Parrott & Rankin
ATTORNEYS

INVENTORS
ROBERT G. DEXTER &
BY ROBERT P. BLAKE

ATTORNEYS

United States Patent Office 3,246,816
Patented Apr. 19, 1966

3,246,816
WEB GRIPPING AND FEEDING MECHANISMS AND METHODS
Robert G. Dexter, Harvard, and Robert P. Blake, Winchester, Mass., assignors, by mesne assignments, to Riegel Textile Corporation, New York, N.Y., a corporation of New York
Filed Dec. 31, 1963, Ser. No. 334,700
13 Claims. (Cl. 226—4)

This invention relates to mechanisms and methods for gripping and feeding a traveling web of material and particularly to sensing a bar of a different weave in the traveling web for gripping and feeding the bar to cutting mechanisms or the like.

In prior times when a traveling web of material was to be presented to cutting mechanisms, such as shown in our copending application Serial No. 334,780, filed Dec. 31, 1963, or the like for severing the traveling web into individually cut pieces or similar operations, the problem of presenting the traveling web in such a manner that the cutting or similar operation could be made along the filling or weft line of the web arose.

In the manufacture of diapers, towels, etc., it is particularly important that the cutting mechanism make a straight clean cut through the traveling web to sever individually cut pieces from the web and present cut edges which are along the filling or weft lines of the web. In the cutting of diapers or the like, such as disclosed in our above identified co-pending application, it is sometimes desired to cut or pink the traveling web along a pinking or cutting bar of plain weave construction which extends across the width of the web, while the remaining portion of the web may be of a conventional Birdseye weave or any suitable weave. In attempting to sever the traveling web along the pinking or cutting bar, the problems of presenting the pinking or cutting bar to the cutting mechanism in such a manner that the bar is properly tensioned, straight, and arrives directly at the cutter at the time the cut is to be made can arise.

In accordance with this invention, applicants have provided a mechanism and method by which a cutting or pinking bar in a traveling web of material may be gripped, fed, and presented to a cutting mechanism under proper transverse tension which is straight and arrives at the time the cut is to be made.

One illustrative but non-limiting example of how this may be accomplished is by gripping a web of material by a series of pairs of auxiliary grippers along the longitudinal edges thereof. These auxiliary grippers are disposed on an endless chain on each side of the web and feed the web forward. As the web is being pulled forward by the auxiliary grippers, a series of pairs of main grippers secured to an endless chain on each side of the web begin following the auxiliary grippers on each longitudinal edge of the web in an unclamped position at a speed less than the travel of the web and auxiliary grippers. Cooperating with the main grippers and traveling therewith are photocells disposed adjacent each longitudinal edge of the web and adapted to sense the cutting bar as it passes over the photocell to actuate the main grippers on that edge of the web. The main grippers are so constructed that they will grip the cutting bar on each side of the bar. If the bar is being fed by the auxiliary grippers crooked or otherwise, the main grippers of each pair on each longitudinal edge will not grip the web until the cutting bar has passed over the photocell traveling with each gripper. Therefore, the cutting bar, when it has been gripped by both main grippers of a pair, will be straight and fed in a position that is 90 degrees to the path of travel of the web. When the main grippers have gripped the web, the auxiliary grippers are released and the web is fed forward by the main grippers alone. The spacing between the pairs of main grippers is less than that of the pairs of auxiliary grippers so that the traveling web is festooned between these pairs of main grippers to relieve any longitudinal tension. The main grippers, which are now feeding the material, are arranged to ride along a cam which will cam the grippers outwardly and thereby furnish a transverse tension in the gripped cutting bar for proper cutting of the web. The cutting mechanism, which does not form any part of this invention, is timed in accordance with the travel of the main grippers to sever the web along the cutting bar while the cutting bar is being held and fed by the main grippers.

Figure 6:
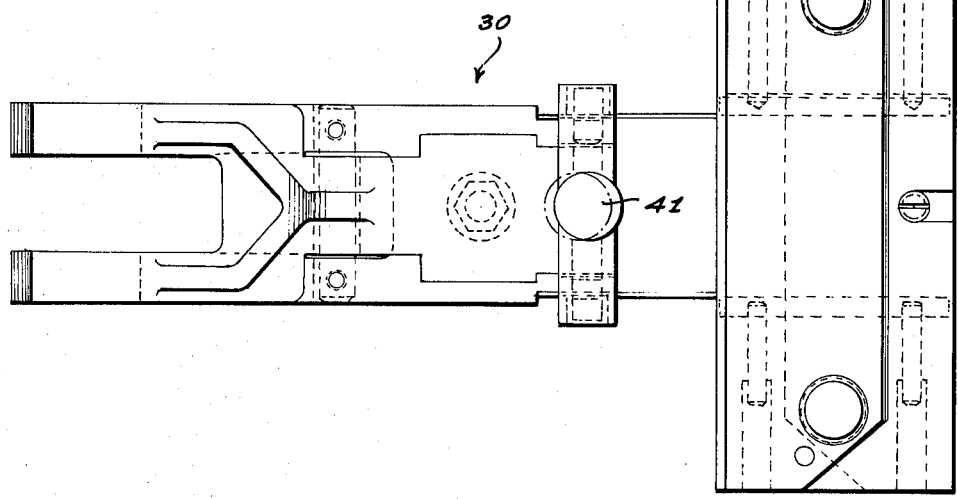
Figure 7:
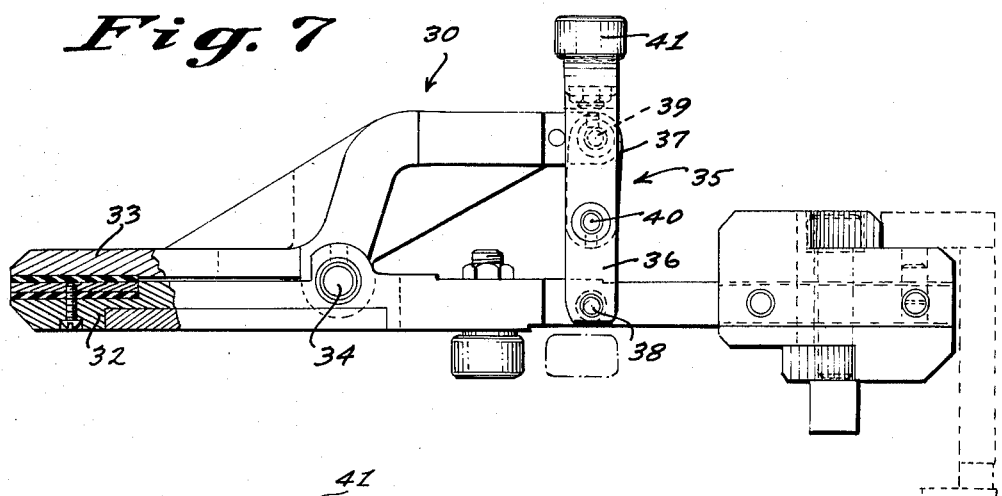
Figure 8:
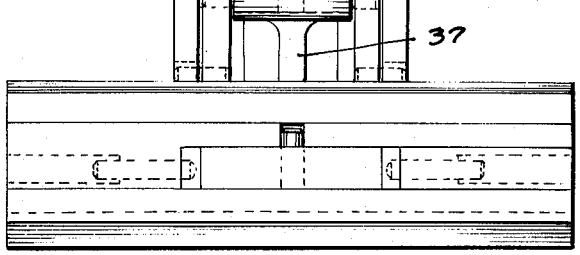
Figure 9:
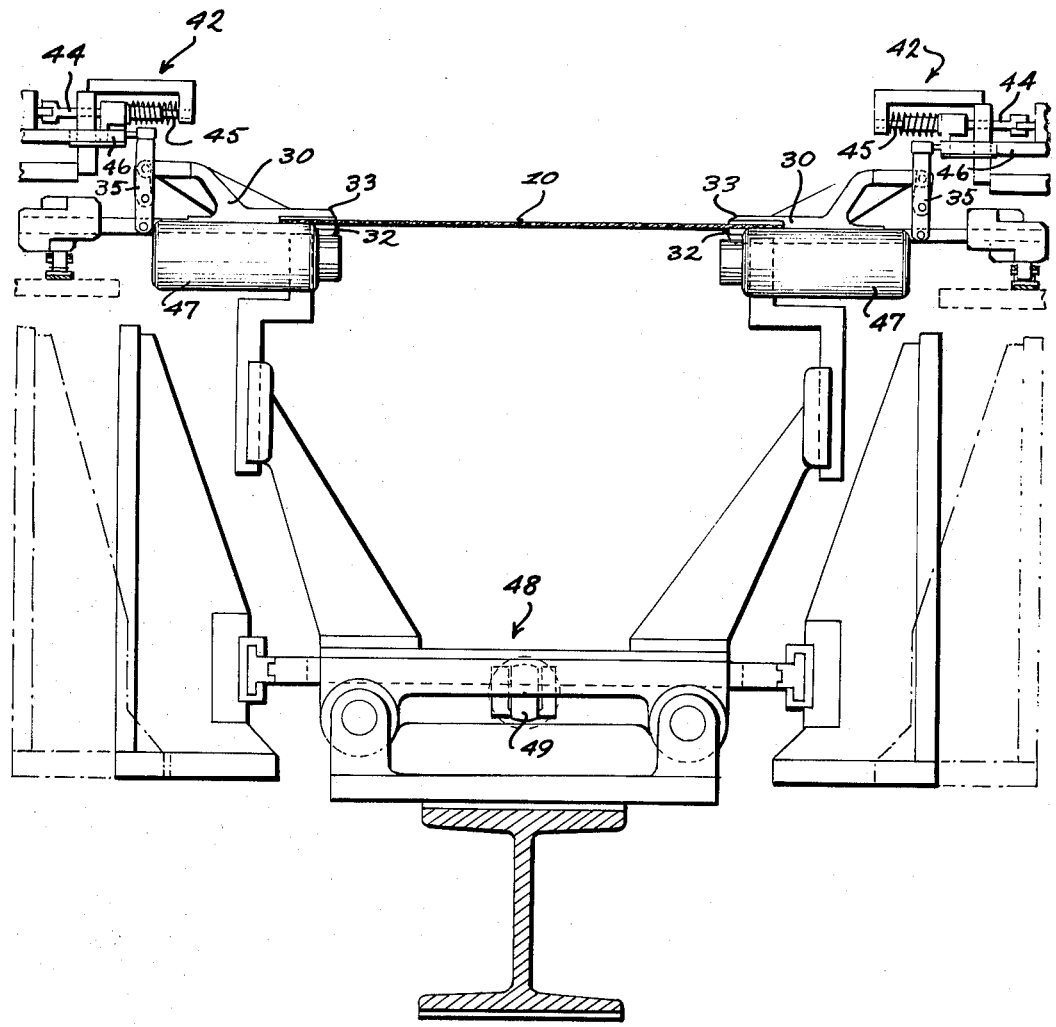
Figure 10:
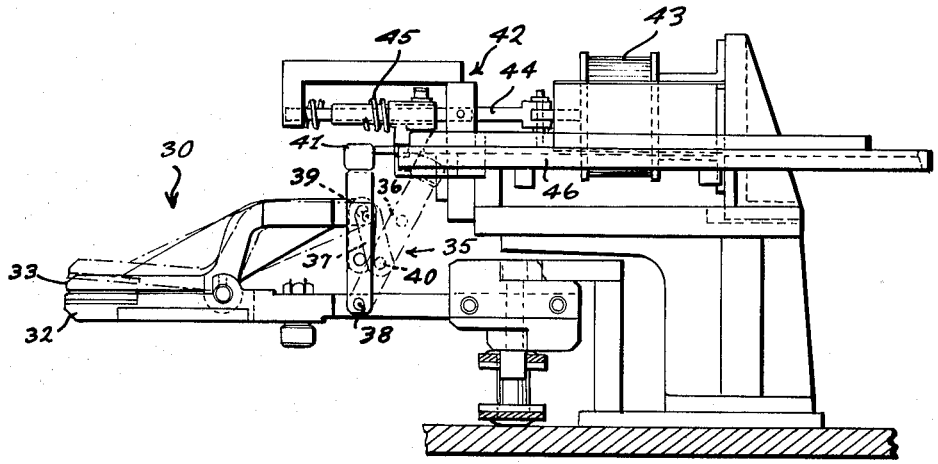
Figure 11:
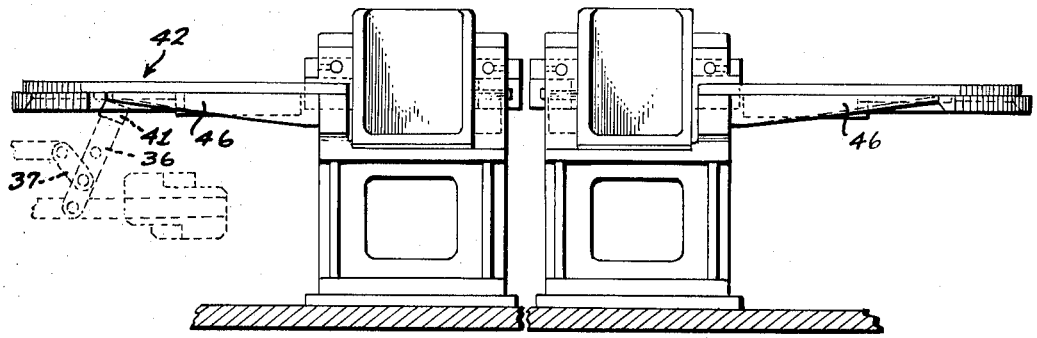

Further features of this invention will be understood from a consideration of the following more detailed description taken in conjunction with the accompanying drawings, in which:

FIG. 1 is a top view of the web gripping and feeding mechanisms;
FIG. 2 is a side elevation view in part illustrating particularly the auxiliary grips disposed on an endless chain;
FIG. 3 is a top view of the auxiliary grippers;
FIG. 4 is a side view of an auxiliary gripper;
FIG. 5 is a front view of an auxiliary gripper;
FIG. 6 is a top view of a main gripper;
FIG. 7 is a side view of a main gripper;
FIG. 8 is a front view of a main gripper;
FIG. 9 is a cross-sectional rear elevational view illustrating the main grippers and associated photocells;
FIG. 10 is a side elevation view of a main gripper and its actuating mechanism; and
FIG. 11 is a rear elevation view of main gripper closing solenoids.

According to this invention a web of woven textile material 10 or the like is led to the gripping and feeding mechanism of this invention, as shown in FIGS. 1 and 2. This web of material may have a cutting or pinking bar 11 therein.

The web 10 is gripped on each longitudinal edge or selvedge by auxiliary grippers 12. The auxiliary grippers 12 are secured on driven endless chains 13 on each side of the traveling web 10 and are arranged to move in horizontal planes, as shown in FIGS. 1, 2 and 5. The auxiliary grippers 12 comprise fixed jaws 14 and movable jaws 15. The movable jaws 15 are secured to shafts 16 which are disposed within apertures 17 in the fixed jaws 14 for pivotal movement, as shown in FIG. 4. The shafts 16 have pins 51 and 52 secured thereto for pivoting the shaft 16 and jaws 15. The shafts 16 and movable jaws 15 are biased upwardly in a nonclamping position by any convenient means (not shown). The movable jaws 15 include front portions 18 and rear portions 19. The front portions 18 are adapted to cooperate with the fixed jaws 14 to clamp the web 10. The rear portions 19 are fixed to the front portions 18 and the shafts 16 by means of sleeves 20 and levers 21. Cooperating with the movable jaws 15 and the fixed jaws 14 are bell crank levers 22 having arms 23 and 24. Arms 23 are pivoted at 25 to the rear portions 19 of movable jaws 15 and arms 24 are pivoted at 26 to fixed jaws 14. The arms 23 and 24 are pivoted to each other at 27. The bell crank levers 22 further include cam followers 28, as shown in FIG. 4. Cooperating with the cam followers 28 are cam members 29 which are fixed to the stationary machine frame on each side of the web 10, as shown in FIG. 1.

In operation the auxiliary grippers 12 move with the endless chains 13 in an unclamped position through the bottom stroke of their path, as viewed in FIG. 2. As the auxiliary grippers 12 reach the upper portion of their path, the movable jaws 18 are displaced 90 degrees to clear the selvedges. To pivot the jaws 18 into position for gripping the web, one of the pins 51 or 52 engages stationary cams (not shown) and pivots the jaw 18 into position. After this pivoting action, the cam follower 28 is engaged by stationary cam 29 which cams the bell crank lever 22 into the position shown in FIG. 4 to close the movable jaw 15 on the fixed jaw 14 to clamp the web 10 therebetween and feed the web forward.

Associated with the auxiliary grippers 12 are main grippers 30. These main grippers 30 are fixed to driven endless chains 31 on each side of the traveling web 10 and are arranged to move in horizontal planes, as shown in FIGS. 1 and 2. The main grippers 30 comprise fixed jaws 32 and movable jaws 33. The movable jaws 33 are pivoted to the fixed jaws 32 at 34, as shown in FIG. 7. The movable jaws 33 and fixed jaws 32 are bifurcated at the front portions thereof as may be seen in FIG. 6. The bifurcated portions are adapted to clamp together to grip the traveling web 10 on both sides of the cutting or pinking bar 11, as shown in FIG. 1. Associated with the movable jaws 33 and the fixed jaws 32 are bell crank levers 35 having arms 36 and 37. Arms 36 are pivoted to the rear portions of fixed jaws 32 at 38. Arms 37 are pivoted to the rear portions of movable jaws 33 at 39. The arms 36 and 37 are pivoted to each other at 40. Secured to the arms 36 are rolls 41. The bell crank levers 35 are adapted to close the main grips in locking position on the web 10.

Cooperating with the rolls 41 to close the main grips 30 are solenoid mechanisms 42 disposed on each side of the traveling web 10 as may be seen in FIGS. 1, 9, 10 and 11. These solenoid mechanisms 42 comprise conventional solenoid members 43 and shafts 44. These shafts 44 are spring biased by springs 45 to the right as viewed in FIG. 10. Secured to and adapted to move with the shafts 44 are plates 46. These plates 46 are arranged, as may be seen in FIGS. 9, 10, and 11, to contact the rolls 41 when the solenoids 43 are actuated to close the main grippers 30 through bell crank levers 35 to grip the web 10.

Associated with the solenoid mechanisms 42 are photocells 47 disposed under each longitudinal edge of the traveling web 10 and directly behind a main gripper 30 as may be seen in FIGS. 1 and 9. The photocells may be actuated by any convenient light supply (not shown) located above the traveling web 10. The photocells are mounted on a carriage member indicated generally by the reference numeral 48 in FIGS. 1 and 9. The carriage 48 is slidably secured to the stationary machine frame and is adapted to be reciprocated back and forth by reciprocating shaft 49. The carriage 48 will therefore reciprocate the photocells 47 back and forth through a stroke which is indicated by the solid and dotted line positions of the photocells in FIG. 1. The speed of travel of the photocells 47 is exactly the same as the main grippers in the forward stroke.

Referring to FIG. 1, it may be seen that the main grippers 30 are so arranged to ride along a cam member 50 after they have clamped the web 10. The cam member 50 will cam each pair of main grippers outwardly to provided a tranverse tension in the web 10 necessary for a subsequent cutting operation or the like.

In operation, a pair of auxiliary grippers 12 has gripped the traveling web 10 along the longitudinal edges and is feeding it in the direction of the arrows in FIG. 1 in accordance with the operations described above. These auxiliary grippers may be traveling at a speed of 34.5 inches per second. As the web 10 is being pulled forward by the auxiliary grippers, a pair of main grippers 30 comes to the forward position of its horizontal path of travel and begins following the auxiliary grippers, as shown in FIG. 1, in an unclamped position, as represented by the dotted lines position of FIG. 10. These main grippers 30 are traveling at a speed of 16.5 inches per second or about one half the speed of the auxiliary grippers 12. Simultaneously with this following action of the main grippers 30, the photocells 47 begin their forward stroke at the same speed as the main grippers and are disposed immediately behind the main grippers. Since the web 10 is being fed by the auxiliary grippers 12 faster than the travel of the main grippers 30 and photocells 47, the web 10 will be pulled through the unclamped jaws 32 and 33 of the main grippers 30 and over the photocells 47. When the cutting bar 11 of the web 10 passes over one of the photocells 47, the photocell will actuate the solenoid mechanism 42 through a suitable time delay relay to cause the bifurcated jaws 32 and 33 to close and clamp the web 10 on each side of the cutting bar 11 through the action of roll 41 and bell crank lever 35. If the cutting bar 11 is being fed crooked by the auxiliary grippers 12, then the main grippers 30 will be actuated one at a time until both main grippers of a pair have gripped the cutting bar. This action will straighten the cutting bar and hold it disposed at a 90 degree angle to the direction of travel. When the main grippers have gripped the web 10 the auxiliary grippers 12 will be released by another pair of solenoids or a safety cam 29 (not shown). The movable jaws 18 will then be pivoted 90 degrees by the action of one of the pins 51 or 52 on stationary cams (not shown) to clear the selvedge edges of the web on their downward stroke. The web 10 will now be fed forward by the main grippers alone which have the cutting bar 11 clamped between their bifurcated arms. The main grippers will be cammed outwardly by the cams 50 to impose a transverse tension on the cutting bar 11. A cutting mechanism or the like may conveniently be timed to perform its operation on the bar 11 which is gripped and fed by the main grippers.

This invention has been described in detail above for purposes of illustration and is not intended to be limited by this description or otherwise except as defined in the appended claims.

What is claimed is:

1. A web gripping and feeding mechanism comprising a series of pairs of auxiliary grippers disposed on moving endless chains and one gripper of each pair being disposed on each side of a continuous web of material, a series of pairs of main grippers associated with said auxiliary grippers and disposed on other moving endless chains on each side of the web, said main grippers are arranged so that one of said main grippers follows each of said auxiliary grippers in an unclamped position at a speed slower than said auxiliary grippers, and photocells arranged adjacent said main grippers to travel at the same speed as said main grippers and adapted to sense a bar in the web to actuate said main grippers to grip the bar in the web.

2. A web gripping and feeding mechanism, as set out in claim 1, in which, each of said main grippers comprises a bifurcated fixed jaw, a bifurcated movable jaw, and a bell crank lever pivoted to said fixed jaw and to said movable jaw and having roller means thereon adapted to move said bell crank lever to close said bifurcated movable jaw on said bifurcated fixed jaw to grip a bar in the web of material.

3. A web gripping and feeding mechanism, as set out in claim 2, including solenoid actuating means for closing said main grippers, said solenoid actuating means being adapted to be actuated by said photocells and arranged to contact said rollers to close said main grippers for gripping the bar in the web of material.

4. A web gripping and feeding mechanism, as set out in claim 3, including stationary cam means for camming said main grippers outwardly in the transverse direction of the web of material to provide a transverse tension in the web of material.

5. A web gripping and feeding mechanism, as set out in claim 1, including stationary cam means on each side of the web adapted to close said auxiliary grippers in gripping position on the web of material to feed the web of material and for releasing said auxiliary grippers when said main grippers grip the bar in the web of material.

6. A web gripping and feeding mechanism, as set out in claim 4, in which, each of said auxiliary grippers comprise a movable jaw, a fixed jaw, and a bell crank lever pivoted to said fixed jaw and to said movable jaw and having cam follower means thereon which contacts said cam means to close said movable jaw on said fixed jaw to grip the web of material.

7. A web gripping and feeding means comprising auxiliary means for gripping and feeding a continuous web of material, main gripper means for gripping and feeding a predetermined portion of the web of material, and sensing means for sensing the predetermined portion of the web of material and for actuating said main gripper means to grip the predetermined portion of the web of material.

8. A web gripping and feeding means, as set out in claim 7, in which said main gripper means are bifurcated to grip the predetermined portion of the web of material on each longitudinal side thereof leaving the middle of the predetermined portion ungripped.

9. A web gripping and feeding means as set out in claim 8, including solenoid means for closing said main gripper means to grip the predetermined portion of the continuous web of material, said solenoid means being actuated by said sensing means.

10. A web gripping and feeding means, as set out in claim 9, including stationary cam means for camming said main gripper means outwardly in the transverse direction of the web of material to provide a transverse tension in the web of material.

11. A web gripping and feeding means, as set out in claim 7, including stationary cam means adapted to close said auxiliary means in gripping position on the web of material to feed the web of material and for releasing said auxiliary means when said main gripper means have gripped the predetermined portion of the web of material.

12. The method of gripping and feeding a predetermined portion of a continuous web of material including the steps of gripping the web of material at any portion thereof by auxiliary gripping means, feeding the web forward over a sensing means and other gripping means, sensing a predetermined portion of the web of material, gripping the predetermined portion of the web by other gripping means, releasing the auxiliary gripping means, and feeding the web of material by the other gripping means.

13. The method of gripping and feeding a predetermined portion of a continuous web of material, as set out in claim 12, including the step of camming the other gripping means outwardly in the transverse direction of the web of material to place a transverse tension on the web of material.

References Cited by the Examiner

UNITED STATES PATENTS 3,182,536   5/1965   Sumpter et al. _____ 83—253 X

M. HENSON WOOD, JR., *Primary Examiner.*